(12) United States Patent
Wang et al.

(10) Patent No.: US 12,457,353 B2
(45) Date of Patent: Oct. 28, 2025

(54) CONVOLUTIONAL-NEUTRAL-NETWORK BASED FILTER FOR VIDEO CODING

(71) Applicant: ALIBABA GROUP HOLDING LIMITED, Grand Cayman (KY)

(72) Inventors: Zhao Wang, Beijing (CN); Yan Ye, San Diego, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 18/404,276

(22) Filed: Jan. 4, 2024

(65) Prior Publication Data

US 2024/0146951 A1 May 2, 2024

Related U.S. Application Data

(63) Continuation of application No. 17/232,652, filed on Apr. 16, 2021, now Pat. No. 11,902,561.

(60) Provisional application No. 63/012,148, filed on Apr. 18, 2020.

(51) Int. Cl.
*H04N 19/513* (2014.01)
*G06N 3/08* (2023.01)
*H04N 19/105* (2014.01)
*H04N 19/176* (2014.01)
*H04N 19/82* (2014.01)

(52) U.S. Cl.
CPC ............ *H04N 19/513* (2014.11); *G06N 3/08* (2013.01); *H04N 19/105* (2014.11); *H04N 19/176* (2014.11); *H04N 19/82* (2014.11)

(58) Field of Classification Search
CPC .......... G06N 3/045; G06N 3/048; G06N 3/08; H04N 19/105; H04N 19/176; H04N 19/51; H04N 19/513; H04N 19/82
See application file for complete search history.

(56) References Cited

U.S. PATENT DOCUMENTS

| | | |
|---|---|---|
| 8,116,375 B2 | 2/2012 | Gao et al. |
| 10,740,891 B1 * | 8/2020 | Chen .................. G06T 7/0008 |
| 10,867,217 B1 | 12/2020 | Madden et al. |
| 2012/0170647 A1 * | 7/2012 | He ...................... H04N 19/18 |
| | | 375/240.18 |

(Continued)

FOREIGN PATENT DOCUMENTS

| | | |
|---|---|---|
| WO | WO 2017/036370 A1 | 3/2017 |
| WO | WO 2019/194425 A1 | 10/2019 |

OTHER PUBLICATIONS

Bross et al., "Versatile Video Coding (Draft 7), "JVET-P2001-vE, 16th Meeting: Geneva, CH, Oct. 1-11, 2019, 488 pages.

(Continued)

*Primary Examiner* — Md N Haque
(74) *Attorney, Agent, or Firm* — Finnegan, Henderson, Farabow, Garret & Dunner, LLP

(57) ABSTRACT

The present disclosure provides methods for convolutional-neural-network (CNN) based filter for video coding. An exemplary method includes: applying motion estimation to a target coding block, to determine a reference block of the target coding block; inputting, to a convolutional neural network (CNN) filter, image data associated with the target coding block and the reference block; and executing the CNN filter to determine a residual associated with the target coding block based on the input image data.

20 Claims, 11 Drawing Sheets

(56) References Cited

U.S. PATENT DOCUMENTS

| | | | |
|---|---|---|---|
| 2019/0130571 A1 | 5/2019 | Allmendinger et al. | |
| 2019/0238879 A1 | 8/2019 | Han et al. | |
| 2022/0021905 A1* | 1/2022 | Ma | H04N 19/124 |
| 2022/0295116 A1* | 9/2022 | Ma | H04N 19/117 |

OTHER PUBLICATIONS

Chauvet et al., "Adaptive Post Filter for Reducing Block Artifacts in High Efficiency Video Coding," 2016 International Conference on Multimedia Systems and Signal Processing, pp. 22-25 (2016).

Duanmu et al., "Fast Motion Estimation Mode Decision Algorithm for H.264/AVC Video Coding Standard," 2009 Asia Pacific Conference on Postgraduate Research in Microelectronics & Electronics (PrimeAsia), Shanghai, 2009, pp. 313-316.

Fu et al., "Sample Adaptive Offset in the HEVC Standard," IEEE Transactions on Circuits and Systems for Video Technology, vol. 22, No. 12, pp. 1755-1764 (2012).

He et al., "Deep Residual Learning for Image Recognition," In Proceedings of the IEEE conference on computer vision and pattern recognition (pp. 770-778) (2019).

Hoang et al., "B-DRRN: A Block Information Constrained Deep Recursive Residual Network for Video Compression Artifacts Reduction," 2019 Picture Coding Symposium (PCS), Ningbo, China, 2019, pp. 1-5.

Jia et al., "Content-Aware Convolutional Neural Network for In-Loop Filtering in High Efficiency Video Coding," IEEE Transactions on Image Processing, vol. 28, No. 7, pp. 3343-3356 (2019).

Jia et al., "Spatial-Temporal Residue Network Based In-Loop Filter for Video Coding," 2017 IEEE Visual Communications and Image Processing (VCIP), St. Petersburg, FL, 2017, pp. 1-4.

Jin et al., "Composite Modeling of Optical Flow for Artifacts Reduction," 2009 IEEE International Conference on Multimedia and Expo, New York, NY, 2009, pp. 233-236.

"JVET software repository," https://https://jvet.hhi.fraunhofer.de/svn/svn HMJEMSoftware/.: https://jvet.hhi.fraunhofer.de/svn/svn_HJEMSoftware/branches/HM-13.0-QTBT/.

Khemiri et al., "Fast Motion Estimation for HEVC Video Coding," 2016 International Image Processing, Applications and Systems (IPAS), Hammamet, 2016, pp. 1-4.

Lai et al., "Fast Motion Estimation Based on Diamond Refinement Search for High Efficiency Video Coding," 2019 IEEE International Conference on Consumer Electronics (ICCE), Las Vegas, NV, USA, 2019, pp. 1-2.

Nair et al., "Rectified Linear Units Improve Restricted Boltzmann Machines," In Proceedings of the 27th international conference on machine learning (ICML-10) (pp. 807-814).

Norkin et al., "HEVC Deblocking Filter," IEEE Transactions on Circuits and Systems for Video Technology, vol. 22, No. 12, pp. 1746-1754 (2012).

PCT International Search Report and Written Opinion mailed Jul. 28, 2021, issued in corresponding International Application No. PCT/US2021/027680 (7 pgs.).

* cited by examiner

CONVOLUTIONAL-NEUTRAL-NETWORK BASED FILTER FOR VIDEO CODING

CROSS-REFERENCE TO RELATED APPLICATIONS

The present application is a continuation of U.S. patent application Ser. No. 17/232,652, filed Apr. 16, 2021, which claims the benefits of priority to U.S. Provisional Application No. 63/012,148, filed on Apr. 18, 2020, both of which are incorporated herein by reference in their entireties.

TECHNICAL FIELD

The present disclosure generally relates to video processing, and more particularly, to convolutional-neural-network (CNN) based filter for video coding.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a method for CNN based in-loop filter in video processing, the method comprises: applying motion estimation to a target coding block, to determine a reference block of the target coding block; inputting, to a convolutional neural network (CNN) filter, image data associated with the target coding block and the reference block; and executing the CNN filter to determine a residual associated with the target coding block based on the input image data.

Embodiments of the present disclosure provide a system for CNN based in-loop filter in video processing, the system comprising: a memory storing a set of instructions; and a processor configured to execute the set of instructions to cause the system to perform: applying motion estimation to a target coding block, to determine a reference block of the target coding block; inputting, to a convolutional neural network (CNN) filter, image data associated with the target coding block and the reference block; and executing the CNN filter to determine a residual associated with the target coding block based on the input image data.

Embodiments of the present disclosure further provide a non-transitory computer readable medium that stores a set of instructions that is executable by one or more processors of an apparatus to cause the apparatus to initiate a method for CNN based in-loop filter in video processing, the method comprising: applying motion estimation to a target coding block, to determine a reference block of the target coding block; inputting, to a convolutional neural network (CNN) filter, image data associated with the target coding block and the reference block; and executing the CNN filter to determine a residual associated with the target coding block based on the input image data.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
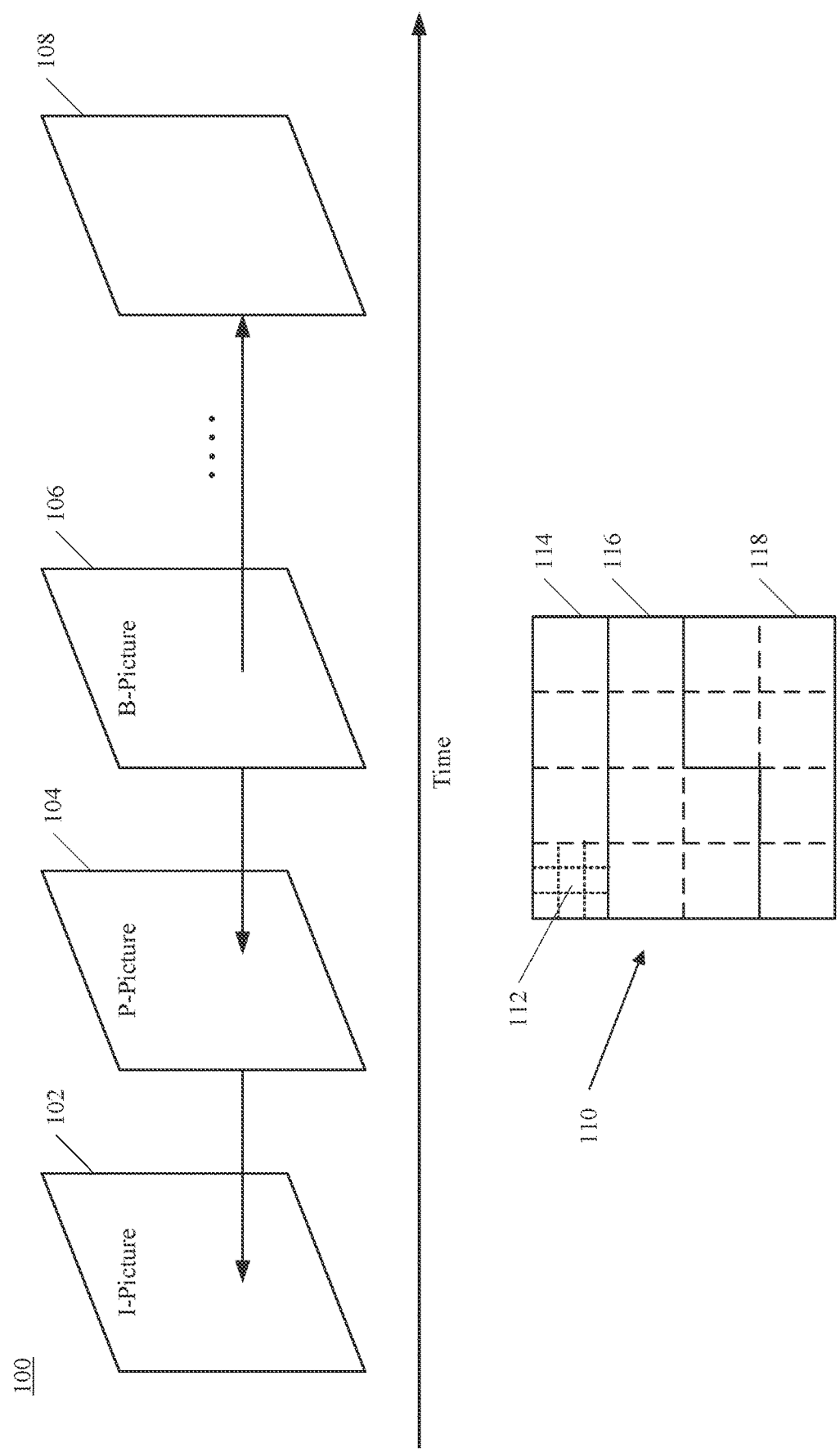
FIG. 1 is a schematic diagram illustrating structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (WET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recently, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
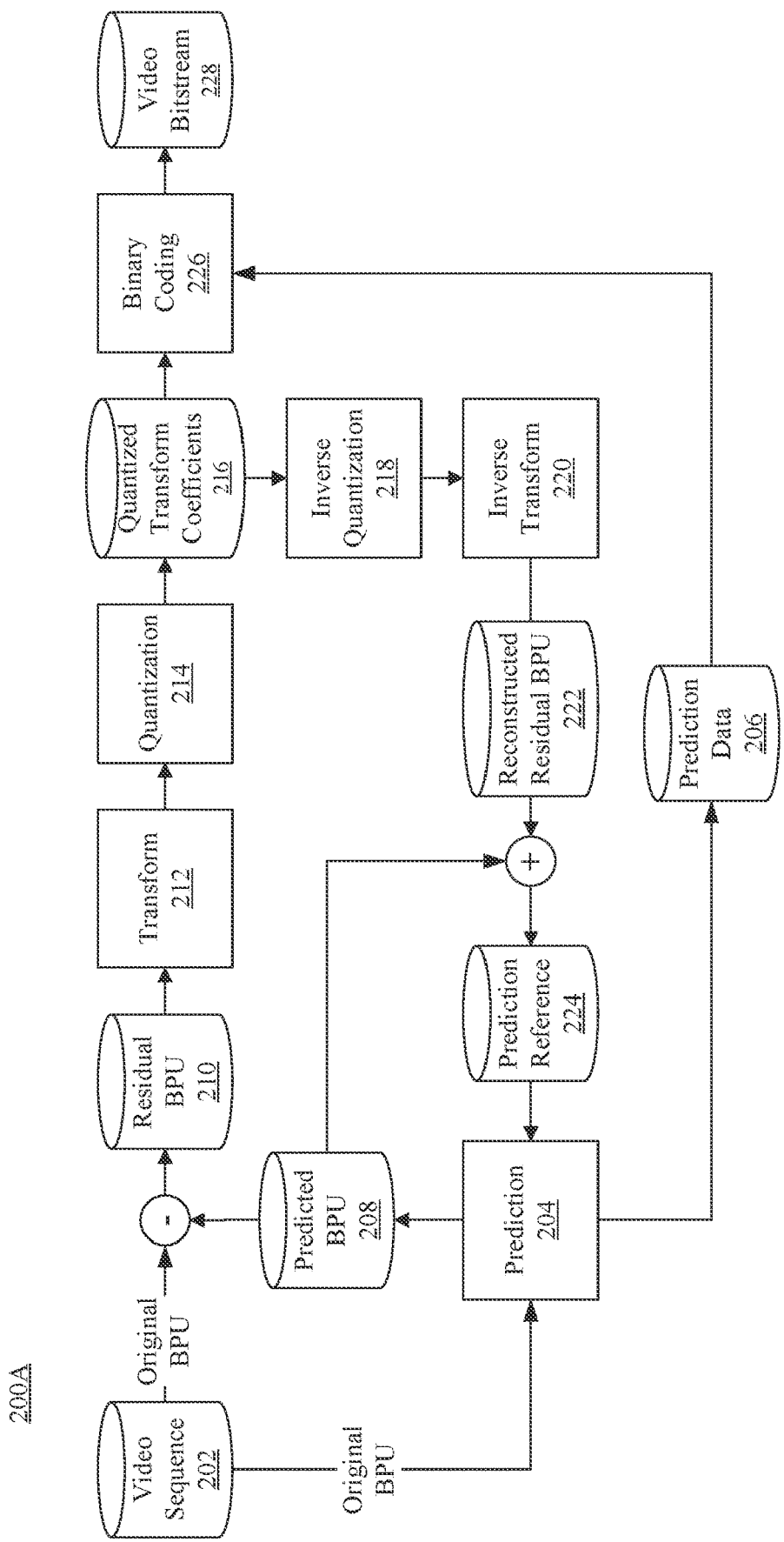
FIG. 2A is a schematic diagram illustrating an exemplary encoding process of a hybrid video coding system, consistent with embodiments of the disclosure.
Figure 2B:
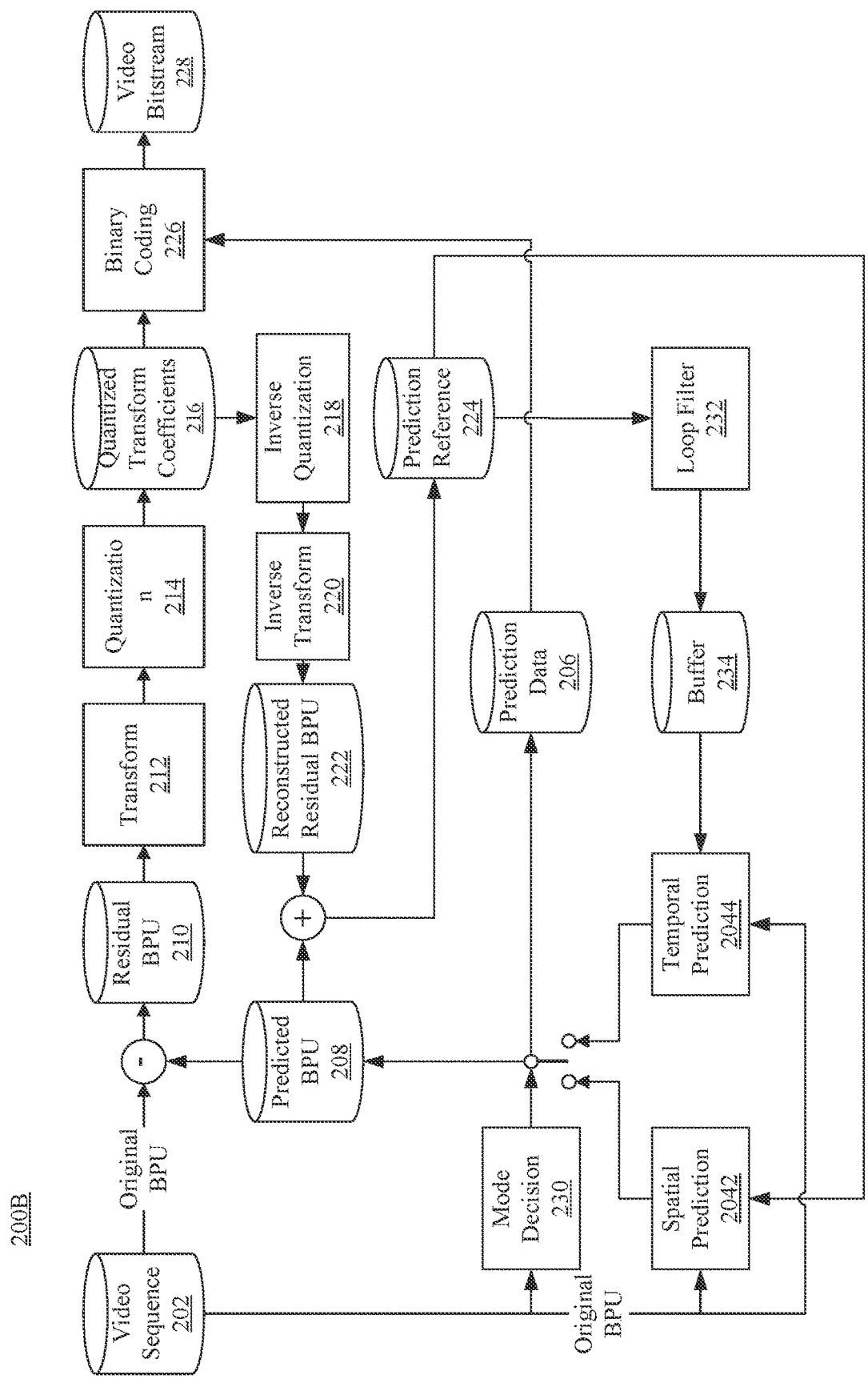
FIG. 2B is a schematic diagram illustrating another exemplary encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion estimation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bitrate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
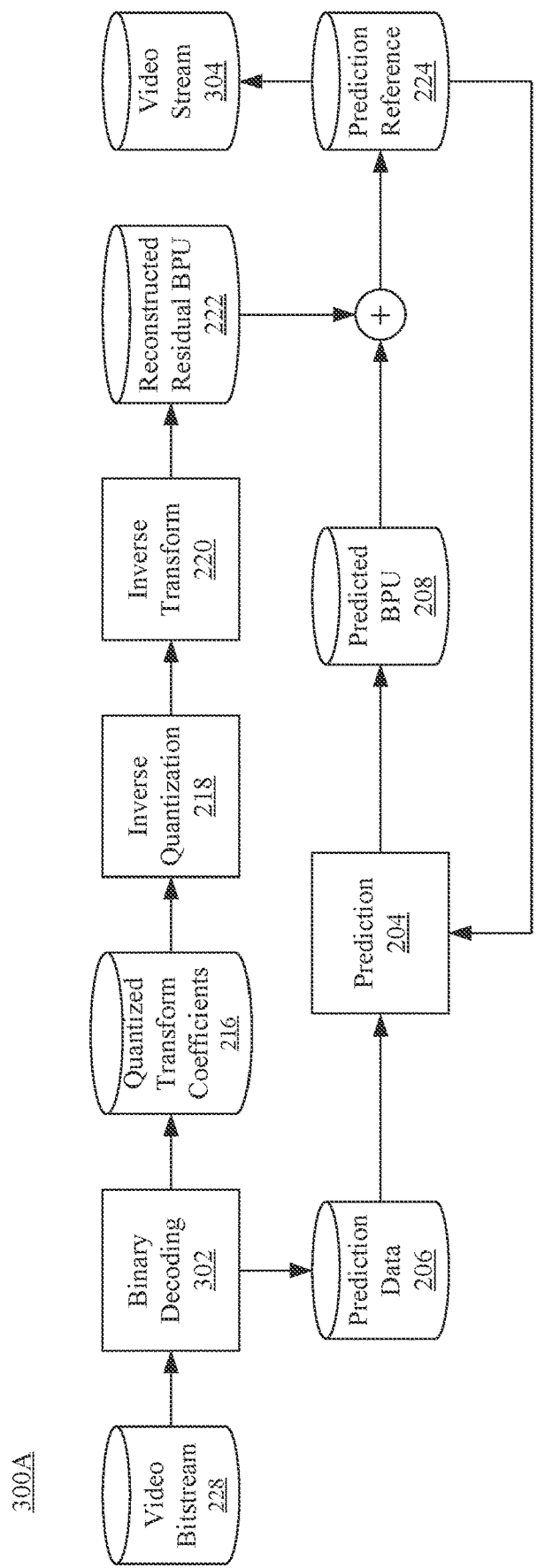
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
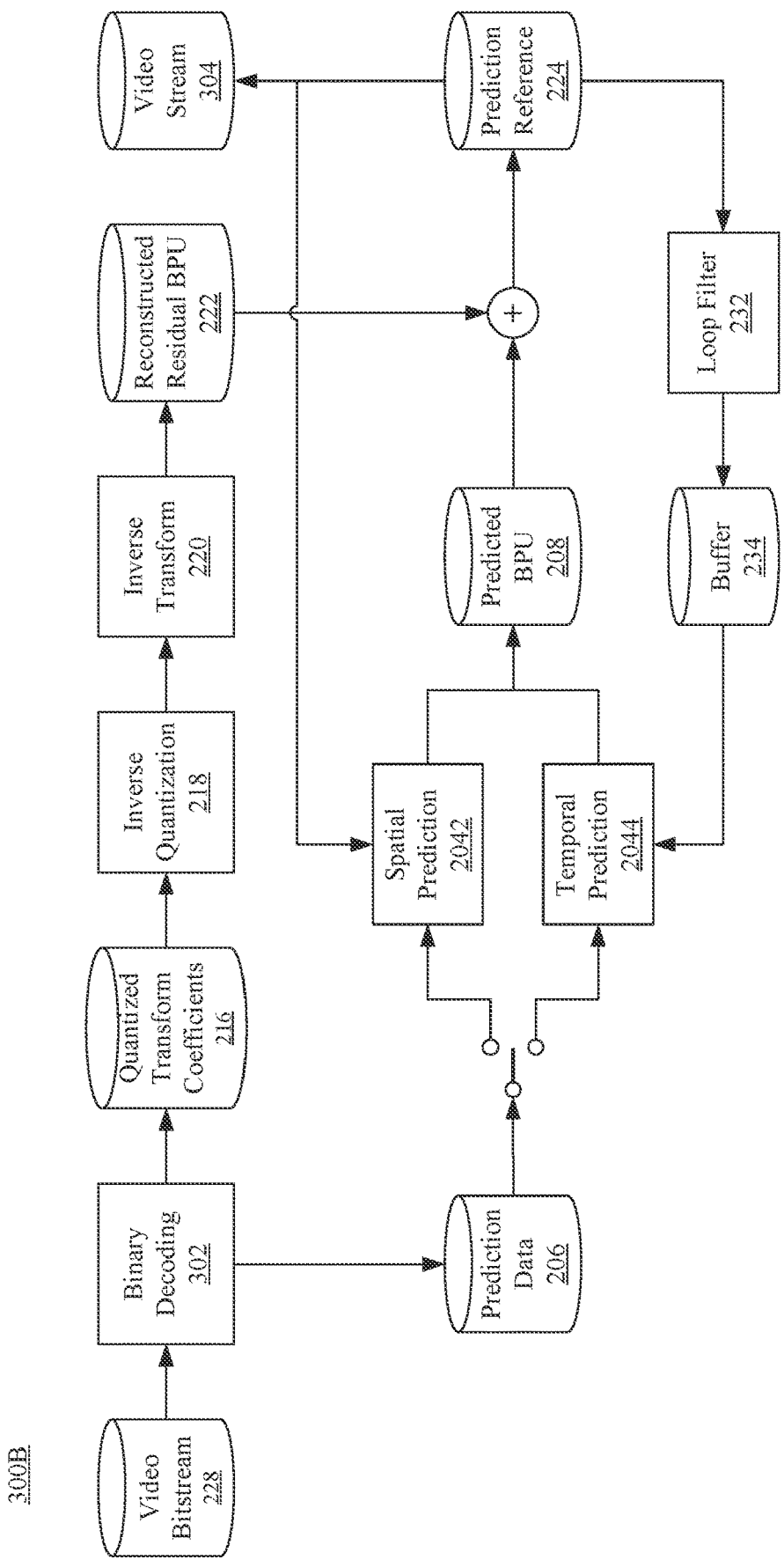
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include parameters of the loop filter (e.g., a loop filter strength). In some embodiments, prediction data includes parameters of the loop filter when the prediction mode indicator of prediction data 206 indicates that inter prediction was used to encode the current BPU.

Figure 4:
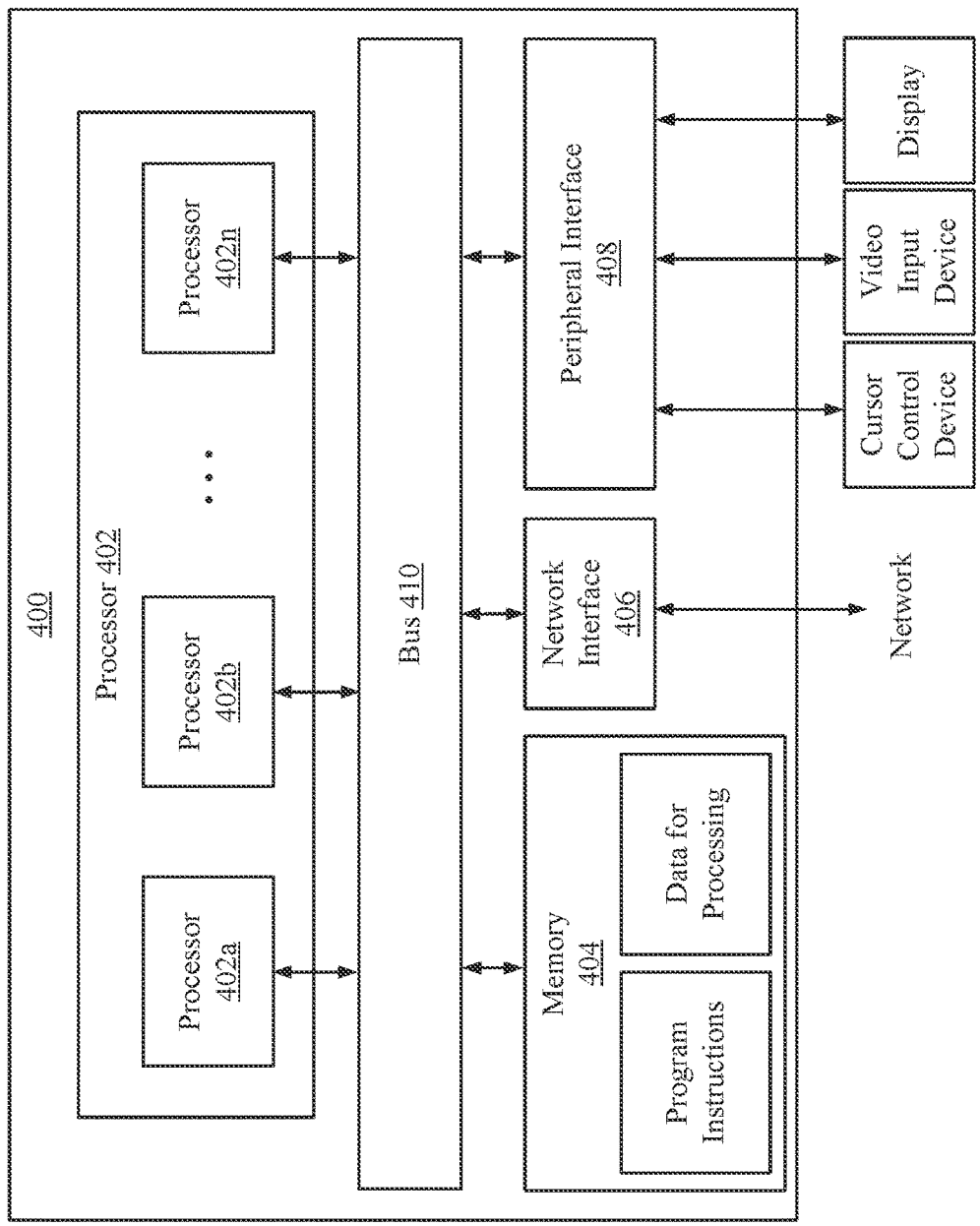
FIG. 4 is a block diagram of an exemplary apparatus for encoding or decoding a video, according to some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

There can be four types of loop filters. For example, the loop filters can include a deblocking filter, a sample adaptive offsets ("SAO") filter, a luma mapping with chroma scaling ("LMCS") filter, and an adaptive loop filter ("ALF"). The order of applying the four types of loop filters can be the LMCS filter, the deblocking filter, the SAO filter, and the ALF. The LMCS filter can include two main components. The first component can be an in-loop mapping of the luma component based on adaptive piecewise linear models. The second component can be for the chroma components, and luma-dependent chroma residual scaling can be applied.

Figure 5:
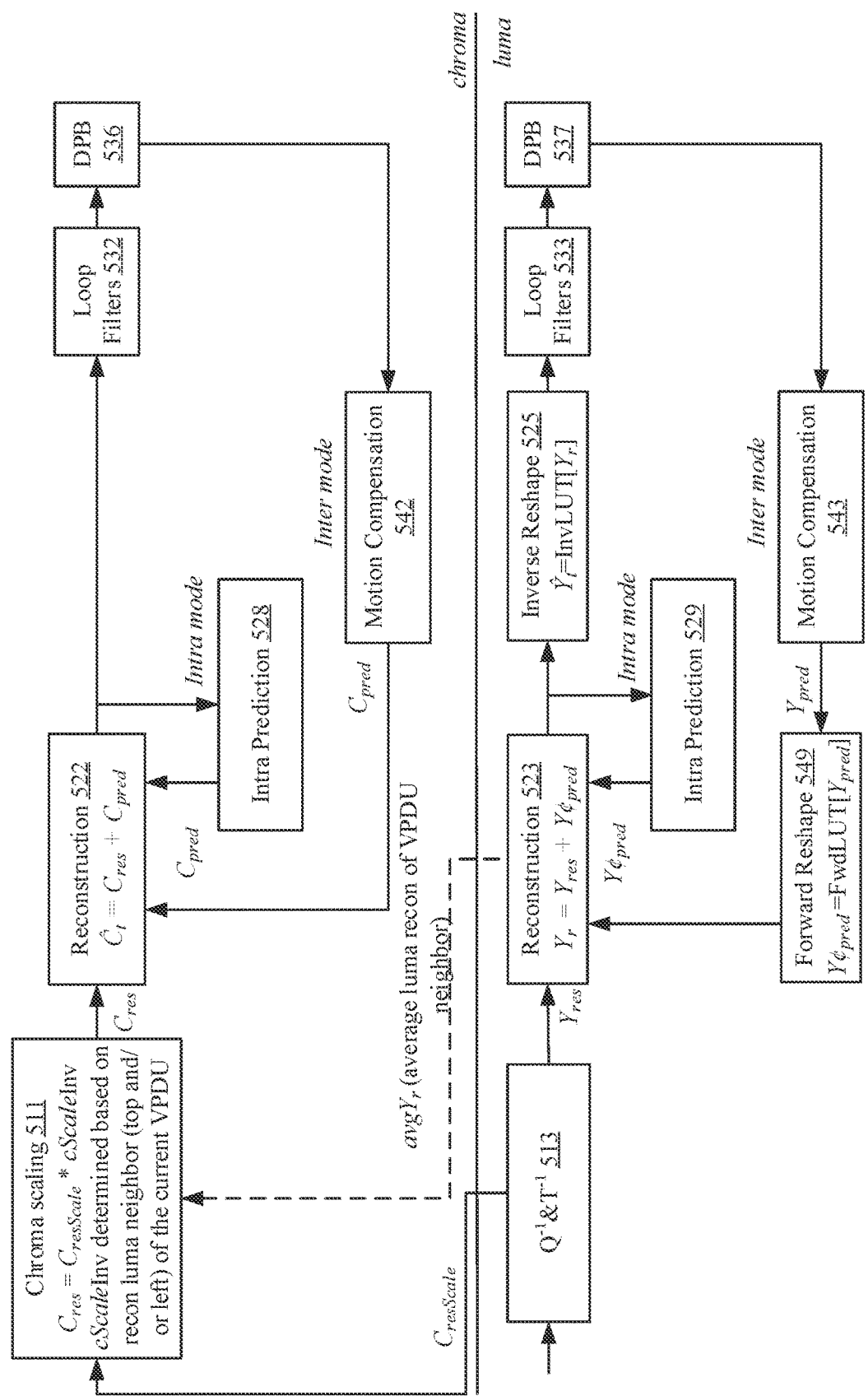
FIG. 5 illustrates an exemplary luma mapping with chroma scaling filter in a decoding process, according to some embodiments of the present disclosure.

FIG. 5 shows a schematic of an example luma mapping with chroma scaling filter in a decoding process, according to some embodiments of the present disclosure. As shown in FIG. 5, components 513, 523, and 529 indicate where the processing can be applied in the mapped domain. These components can include inverse quantization and inverse transform 513, luma intra prediction 529, and adding of the luma prediction together with luma residual in reconstruction 523. Components 522, 528, 532, 536, 533, 537, 542, and 543 shown in FIG. 5 indicate where the processing is applied in the original (e.g., non-mapped) domain. These components can include loop filters 532 and 533 (e.g., deblocking filter, ALF filter, SAO filter, etc.), chroma motion compensated prediction 542, luma motion compensated prediction 543, chroma intra prediction 528, adding of the chroma prediction together with the chroma residual in reconstruction 522, and storage of decoded pictures as reference pictures in DBP 536 and DBP 537. Components 511, 525, and 549 in FIG. 5 can be new LMCS functional blocks, such as forward mapping of the luma signal 549, inverse mapping of the luma signal 525, and a luma-dependent chroma scaling process 511. In some systems (e.g., Test Model 7 of VVC ("VTM7")), LMCS can be enabled or disabled at a sequence level using a sequence parameter set ("SPS") flag.

The deblocking filter can be applied to all samples adjacent to a picture unit ("PU") or a tile unit ("TU") boundary except when the boundary is also a picture boundary or when the deblocking is disabled across slice or tile boundaries. These systems can be modified. For example, in VVC, the following features can be added: a filter strength of the deblocking filter that is dependent on an averaged luma level of reconstructed samples; a deblocking parameter table extension and adaptation to 10-bit video; 4×4 grid deblocking for luma; stronger deblocking filter for luma; stronger deblocking filter for chroma; deblocking filter for subblock boundary; and deblocking decision adapted to smaller differences in motion.

The SAO filter can be a process in decoding that modifies decoded samples by conditionally adding an offset value to each sample after deblocking filter, based on values in look-up tables transmitted by the encoder. In some systems (e.g., VVC or VTM7), the SAO filter can include a band offset mode and an edge offset mode. In the band offset mode, a full sample amplitude range can be uniformly split into 32 segments called bands, and the sample values belonging to four of these bands (which are consecutive within the 32 bands) are modified by adding transmitted values denoted as band offsets. The band offsets can be positive or negative. One of the reasons for using four consecutive bands is that in the smooth areas where banding artifacts can appear, the sample amplitudes in a CTB tend to be concentrated in only few of the bands. In the edge offset mode, a syntax element sao_eo_class with values from 0 to 3 can signal whether a horizontal, vertical or one of two diagonal gradient directions is used for the edge offset classification in the CTB. Each sample in the CTB can be classified into one of five categories by comparing the sample value with the two neighboring samples. For each category, an offset can be signaled to the decoder and added to the corresponding samples.

Figure 6:
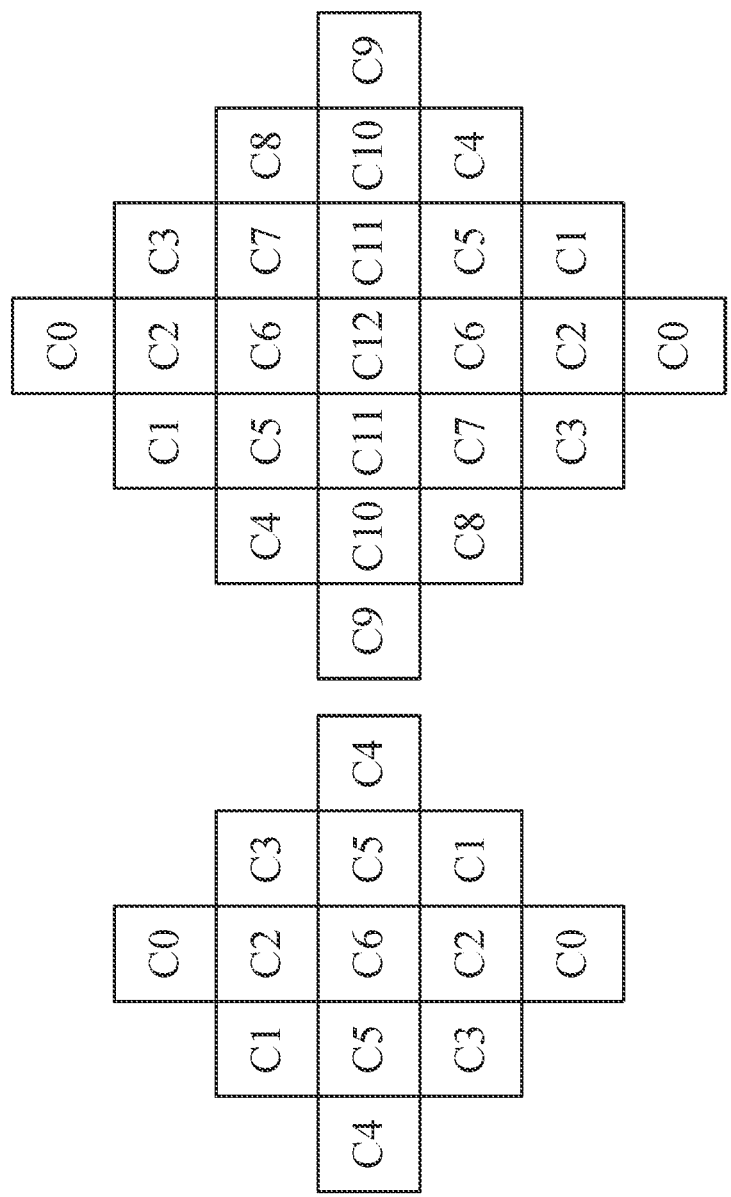
FIG. 6 illustrates exemplary diamond filter shapes for adaptive loop filters, according to some embodiments of the present disclosure.

ALF filter can be applied for grids, such as a 4×4 grid. In some systems (e.g., VVC or VTM7), based on the direction and activity of local gradients, the luma filter unit can be classified into one of 25 categories and a 7×7 diamond filter shape can be used. For each category, one set of filter parameters are signaled in adaptation parameter set ("APS"). For the chroma component, a 5×5 diamond filter shape can be used, and eight sets of parameters can be signaled. FIG. 6 shows a diagram of example diamond filter shapes for adaptive loop filters, according to some embodiments of the present disclosure. As shown in FIG. 6, a 5×5 diamond filter shape is shown, which may be used for the chroma component. A 7×7 diamond filter shape is also shown, which can be used for the luma component. Before filtering each 4×4 luma block, geometric transformations such as rotation or diagonal and vertical flipping can be applied to the filter coefficients and to the corresponding filter clipping values depending on gradient values calculated for that block. This may be equivalent to applying these transformations to the samples in the filter support region.

Consistent with the disclosed embodiments, convolutional neutral networks (CNN) based image/video compression and CNN based loop/post filters can be used in addition to, or in replacement of, one or more of the above described deblocking filter, SAO filter, LMCS filter, and ALF. In an exemplary embodiment, an adaptive CNN based post filter can be used to decrease the blocking artifacts in video coding. The filter is adaptive because it uses different filter parameters depending on block characteristics. Blocks are put in different categories according to transform and prediction parameters and the internal parameters are trained in each case. In another exemplary embodiment, similar content-related multi-model filter can be used, according to which each CTU is treated as an independent region and each CTU can select different CNN models. In some embodiments, to improve the filter performance on the inter frames, the co-located (the same position in the reference frame) reference block can be jointly trained. To further utilize the inter correlation and reduce the blocking artifact, a composite model of the optical flow velocity is mathematically derived and used to further reduce the blocking artifacts.

Besides the CNN, in some embodiments, Recursive Residual Network (RNN) based filter model can also be used. Firstly, an extra network branch is designed for leveraging the block information of the coding unit (CU). Moreover, to avoid a great increase in the network size, RNN structure and sharing weight techniques are applied.

In some embodiments consistent with the present disclosure, the following drawbacks may occur in the deep-learning based filter. First, for the content adaptive multi-model filter methods, multi-model increases the number of parameters dramatically and hence leads to larger overall decoder size, which is constrained in some applications. Second, for the filter in inter frames, directly taking the co-located block as the reference block may lead to mismatch, especially for the fast motion scene. However, optical flow estimation requires a large computational complexity, and it is also hard to achieve higher precision if few reference frames are available. Therefore, how to utilize the information of reference block in a low-complexity way plays a crucial role in the filters of inter frames.

The present disclosure provides methods of spatial-temporal block based CNN filter, to solve one or more of the above drawbacks.

Figure 7:
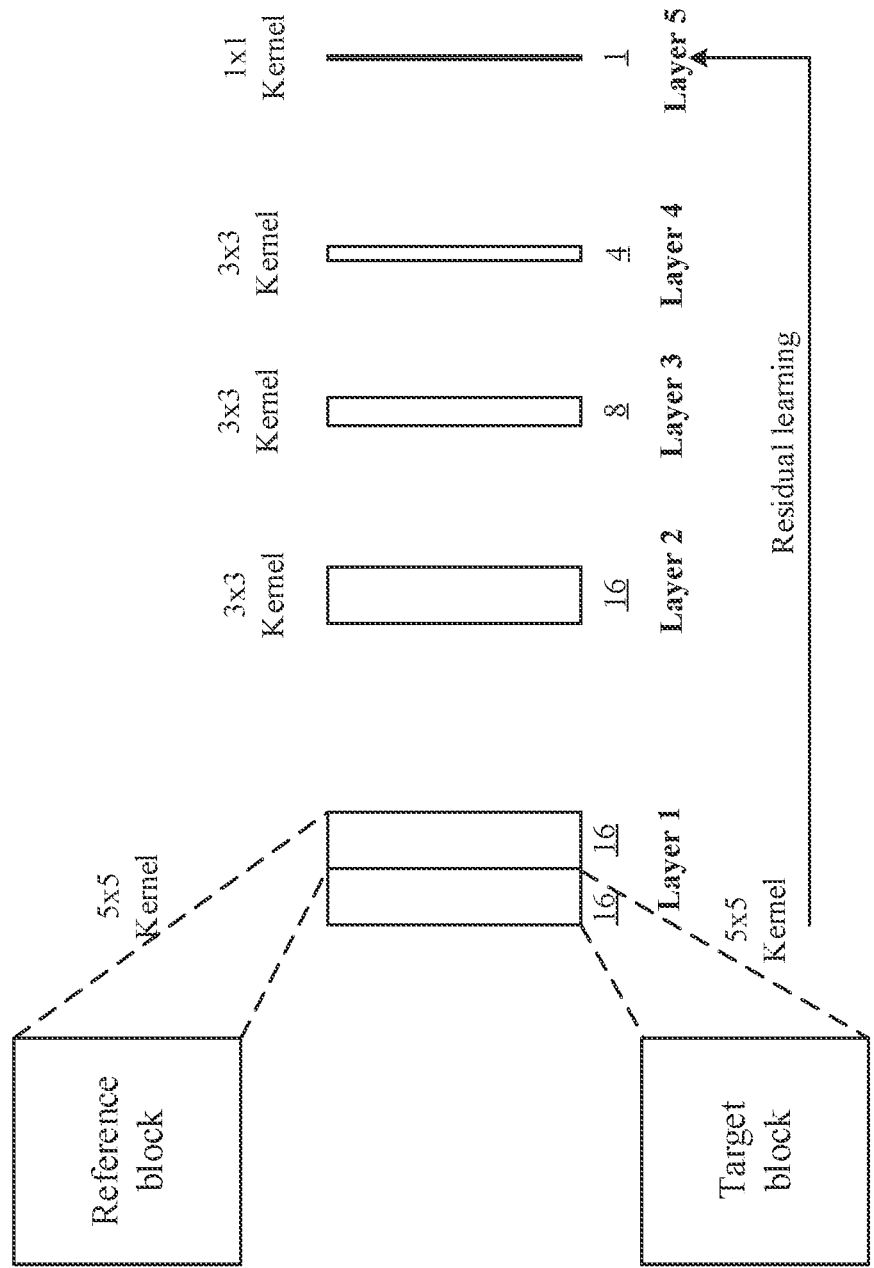
FIG. 7 illustrates an exemplary architecture of a spatial-temporal CNN filter, consistent with some embodiments of the disclosure.

FIG. 7 is a schematic diagram showing the structure of an exemplary convolutional neural network (CNN) filter used in video coding, according to some disclosed embodiments. In the example shown in FIG. 7, the CNN filter has 5 convolutional layers. The number of feature maps in each convolutional layer is indicated below the respective convolutional layer and is underlined. During training or inference of the CNN filter, a target image block (i.e., the current image block to be filtered) and a reference image block associated with the target image block are input to the first convolutional layer, which can use one or more 5×5 filter kernels to extract spatial features from the target image block and reference image block. For example, by using the 5×5 filter kernels, the first convolutional layer can generate 16 features for the target image block, and 16 feature maps for the reference image block. The output features of the first convolutional layer are stacked for subsequent convolutional layers through fusion of spatial feature maps. FIG. 7 shows the first convolutional layer is followed by three more convolution layers (i.e., convolutional layers 2, 3, and 4), all of which utilize 3×3 filter kernels. In some embodiments, rectified linear units (ReLU) are adopted as nonlinear mapping for all convolution layers. To accelerate the speed of training, the convolution layers are designed as residue learning. The fifth layer (i.e., layer 5 in FIG. 7) uses a 1×1 filter kernel and generates one feature map. The final output of the fifth layer is the element-wise sum of the target image block.

The example in FIG. 7 should not considered to be limiting. For example, the disclosed CNN filter is not limited to 5 convolutional layers. Similarly, the filter kernel sizes and numbers of feature maps used by the convolutional layers are not limited to those shown in FIG. 7. The training dataset includes videos that are compressed by a wide range of bit per pixel (bpp) and rich in different contents. With respect to the loss function, only the reconstruction distortion in terms of peak signal-to-noise ratio (PSNR), structural similarity (SSIM), or multiscale structural similarity (MS-SSIM) need to be considered, because no additional bits are introduced by the filter.

In some disclosed embodiments, the temporal reference image block is obtained by motion estimation in one or both of the training or the inference procedure. There are at least two advantages for introducing motion estimation. First, compared to using the co-located block directly, motion estimation can find better reference image block with higher similarity to the target image block. Motion estimation is also better than the optical flow method in most cases. The reference image block with higher correlation to the target image block can provide more information to be utilized in the combined convolutional filtering process. Second, the motion estimation can be conducted before training for each non-overlapped filter unit and the motion vectors (MV) are stored and loaded during the training of each batch. In this way, the introduced complexity of motion estimation is significantly reduced because each filter unit only requires motion estimation once, though it may be trained in many batches.

With respect to the exact motion estimation method, any fast motion estimation methods in video coding can be used. Noticeably, the resolution of motion vector is not fixed. The integer or even 2-integer, 4-integer samples MV resolution can be used to further reduce the computational complexity and fractional MV resolution could be selected to achieve higher precision. Moreover, the MV resolution can be set adaptive as needed. For example, a lower resolution is set for the smooth video content and higher resolution is set for complex content.

Figure 8:
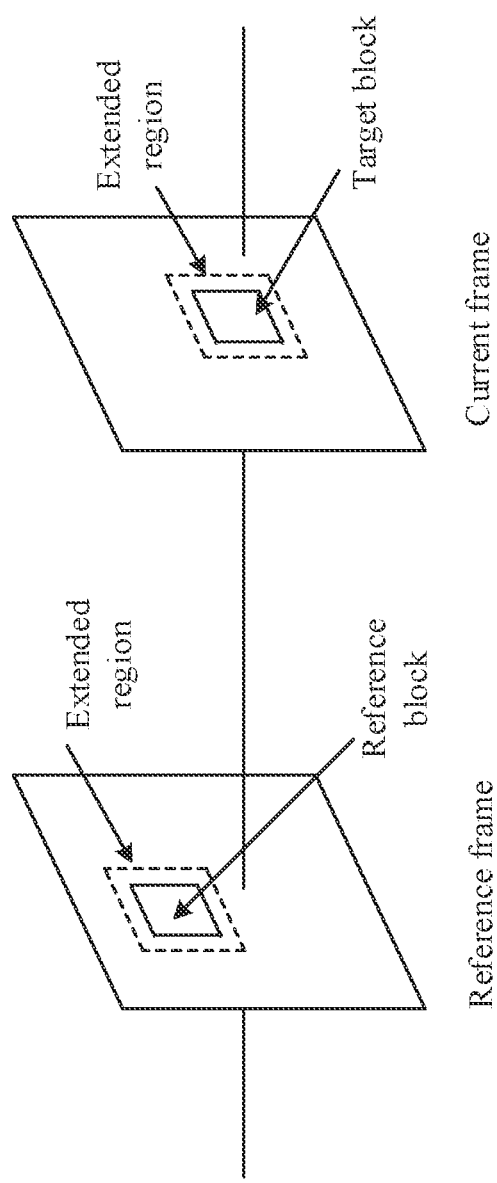
FIG. 8 illustrates an exemplary extended block used in a CNN filter, consistent with some embodiments of the disclosure.

The disclosed methods of spatial-temporal block based CNN filter do not restrict the size of filter unit, which can be 16×16, 32×32, etc. Moreover, an extended block can be used in one or both the training and inference procedures. FIG. 8 shows exemplary extended image regions used in the disclosed CNN filter, according to some disclosed embodiments. As shown in FIG. 8, an extended region (identified by the dash lines in FIG. 8) of the target image block (i.e., the current to-be-filtered block, identified by the solid lines in FIG. 8) can be used in the filtering process. Similarly, an extended region (identified by the dash lines in FIG. 8) of the reference image block (identified by the solid lines in FIG. 8) can be used in the filtering process. The extended regions include the neighboring samples around the target image block and reference image block, respectively. During the filtering process, only the samples in the target image block are filtered and the samples in the extended region of the target image block are kept unchanged. Moreover, the extended regions of the target image block and reference image block are only used in the training and inference of the residual model, but are not considered in the motion estimation process. In some embodiments, four more rows and four more columns of the target image block and reference image block are used as the extended regions. The numbers of the additional rows and columns are not fixed and can be any values in the disclosed embodiments. In order to be consistent between the internal filter units (i.e., units inside the target image block) and the units near a picture boundary of the target image block, the picture will be padded to the same number of rows and columns (e.g., four more rows and four more columns used in the above-described example).

Besides applying the CNN filter on the whole video frames, the rate-distortion optimization decision can be made at the encoder to control the on/off of the filter by a signaled flag. The control decision can be applied on the frame level, CTU level or filter unit level. When the control decision is applied on the frame level, the flag can be signaled in the picture parameter set (PPS), picture header, or slice header. When the control decision is applied on the CTU level or filter unit level, the flag can be organized as a mapping table and signaled in PPS, picture header, or slice header.

Figure 9:
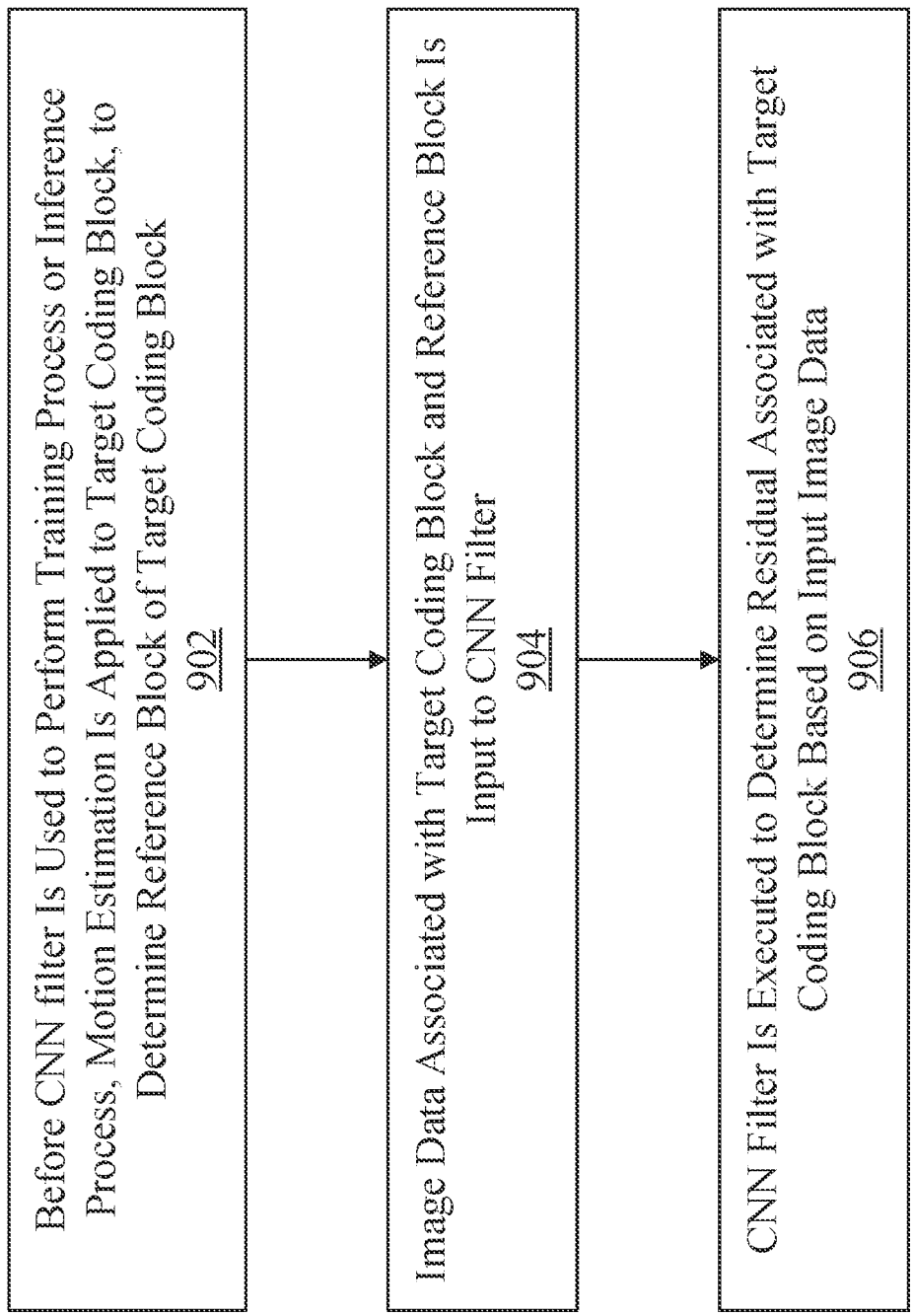
FIG. 9 is a flowchart of an exemplary video coding method for using a neural-network based filter, consistent with some embodiments of the disclosure.

FIG. 9 is a flowchart of an exemplary video coding method 900 for neural-network based filter, according to some embodiments of the present disclosure. In some embodiments, method 900 can be performed by apparatus 400 shown in FIG. 4. The neural-network based filter can be used by an encoder (e.g., the encoder shown in FIG. 2A or 2B) or a decoder (e.g., the decoder shown in FIG. 3A or 3B). For illustrative purpose, method 900 is described below from the perspective of an encoder, and thus the steps of method 900 are described as encoding operations. However, it is contemplated that a video decoder can perform all or a subset of the inverse operations of the encoding operations. Unless otherwise noted, techniques of video encoding described in the present disclosure are also intended to encompass the inverse of the disclosed video decoding techniques (i.e., video decoding techniques associated with the disclosed video encoding techniques), and vice versa. As shown in FIG. 9, method 900 can include the following steps.

In step 902, before the disclosed CNN filter is used to perform a training process or an inference process, motion estimation is applied to a target coding block, to determine a reference block of the target coding block.

As used in the present disclose, "target coding block" is used to denote an image block currently to be filtered by the CNN filter. The target coding block may be a reconstructed block generated by a video encoding process (or a video decoding process if the CNN filter is used by a decoder). The CNN filter can be used to filter the reconstructed block to remove the coding artifacts. In some embodiments, the target coding block may be a coding tree unit (CTU). In some embodiments, the target coding block may also refer to a filter unit filtered by the CNN filter. The filter unit, for example, may have a size of 16×16 pixels, 32×32 pixel, etc. The present disclosure does not limit the size of the filter unit that the CNN filter can act upon.

Consistent with the disclosed embodiments, motion estimation can be employed to identify a reference block associated with the target coding block. The reference block is a co-located block of the target coding block in a reference frame.

Specifically, in some embodiments, the motion estimation can be performed in inter coding to identify prediction blocks that closely match the target coding block. Based on the identified prediction blocks, motion vectors can be generated to indicate the relative displacements between the target coding block and the prediction blocks. The difference between the motion compensated (i.e., prediction) blocks and the target coding block forms residual information that can be compressed using techniques such as spatial frequency transformation (e.g., through a discrete cosine transformation), quantization of the resulting transform coefficients, and entropy coding of the quantized coefficients. Accordingly, the target coding block may be expressed as a combination of motion vector(s) and residual information.

In step 904, image data associated with the target coding block and the reference block is input to the disclosed CNN filter.

Consistent with the disclosed embodiments, the CNN filter used in method 900 includes multiple convolution layers. Each of the multiple convolutional layers uses one or more filter kernels to generate one or more feature maps. In some embodiments, the number of feature maps generated by each convolutional layer is equal to the number of filter kernels used by the respective convolutional kernel.

For example, the CNN filter may have a structure like that shown in FIG. 7. In this example, the CNN filter has five convolutional layers. The first convolutional layer has 32 filter kernels. Moreover, the second, third, fourth, and fifth convolutional layers each can have 16, 8, 4, and 1 filter kernels, respectively. The fifth convolutional layers serves as the output layer of the CNN filter. Moreover, in this example, the filter kernels used in the first convolutional layer may has a size of 5×5, and the filter kernels used in the remaining convolutional layers may have a size of 3×3.

In step 906, the CNN filter is executed to determine a residual associated with the target coding block based on the input image data.

In some embodiments, the first convolutional layer of the CNN filter can be used to extract spatial features of the image data associated with the target coding block and the reference block. Specifically, the first convolutional layer can apply a first set of filter kernels (e.g., 16 out of the 32 5×5 kernel filters in the above example described in connection with FIG. 7) to image data associated with the target coding block, to generate feature maps associated with the target coding, and apply a second set of filter kernels (e.g., the remaining 16 5×5 kernel filters in the above example described in connection with FIG. 7) to image data associated with the reference block, to generate feature maps associated with the reference block. The spatial features extracted from the target coding block and reference block can be fused and input to the subsequent convolutional layers for further processing. In some embodiment, rectified linear units (ReLU) can be adopted as nonlinear mapping for all the convolutional layers.

In some embodiments, extended regions of the target coding block and reference block can be used in the training and inference processes of the CNN filter. As shown by the example in FIG. 8, the extended region of the target coding block can include one or more neighboring rows and one or more neighboring columns of the target coding block. Similarly, the extended region of the reference block can also include one or more neighboring rows and one or more neighboring columns of the reference block.

The extended regions can be used in the training of the CNN filter. Consistent with the disclosed embodiments, before the residual associated with the target coding block is determined, the CNN filter can be trained based on a training data set. The training data set can include a training block and extended region of the training block.

The extended regions can also be used in the inference process of the CNN filter. However, pixels in the extended regions are only used to assist the filtering the target coding block, and will remain unchanged after the filtering.

In some embodiments, the CNN filter can be turned on or off adaptively. Specifically, a first rate distortion associated with the target coding block can be determined when the CNN filter is disabled, and a second rate distortion associated with the target coding block can be determined when the CNN filter is enabled. Then, the first rate distortion can be compared to the second rate distortion. In response to the first rate distortion being equal to or smaller than the second rate distortion, a flag can be signaled to switch off the CNN filter. In response to the first rate distortion being larger than the second rate distortion, a flag can be signaled to switch on the CNN filter.

The flag can be signaled in at least one of a picture parameter set (PPS), a picture header, or a slice header. When the flag is a frame-level flag, the CNN filter can be enabled or disabled for a frame associated with the frame-level flag, based on the value of the frame-level flag.

And when the flag is a CTU-level flag, the CNN filter can be enabled or disabled for a CTU associated with the CTU-level flag, based on the value of the CTU-level flag. The CTU-level flag can be signaled in a table which includes a plurality of CTU-level flags corresponding to a plurality of CTUs respectively. The plurality of CTUs can belong to the same frame and each of the plurality of CTU-level flags indicates whether the CNN filter is enabled or disabled for the corresponding CTU.

According to some embodiments, if the frame-level flag indicates the CNN filter is disabled, the CNN based filtering of the frame no longer proceeds. Additionally, no more CTU level syntax elements associated with the CNN filter needs to be signaled for the frame. In contrast, if the frame-level flag indicates the CNN filter is enabled, additional syntax elements for each CTU of the frame may be signaled to indicate whether the CNN filter is enabled for each of the CTUs in the same frame.

It is appreciated that, one of ordinary skill in the art can combine some of the described embodiments into one embodiment.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

The embodiments may further be described using the following clauses:

1. A computer-implemented video encoding method, comprising:
   applying motion estimation to a target coding block, to determine a reference block of the target coding block;
   inputting, to a convolutional neural network (CNN) filter, image data associated with the target coding block and the reference block; and
   executing the CNN filter to determine a residual associated with the target coding block based on the input image data.

2. The method according to clause 1, wherein the CNN filter comprises a plurality of convolutional layers, each of the plurality of convolutional layers using one or more filter kernels to generate one or more feature maps respectively.

3. The method according to clause 2, wherein executing the CNN filter to determine the residual associated with the target coding block based on the input image data comprises:
   extracting, at a first convolutional layer of the CNN filter, spatial features of the image data associated with the target coding block and the reference block.

4. The method according to clause 3, further comprising:
   fusing the extracted spatial features; and
   inputting the fused spatial features to a subsequent convolutional layer of the first convolutional layer.

5. The method according to any one of clauses 3 and 4, wherein the first convolutional layer uses one or more 5 x5 filter kernels to extract the spatial features of the image data associated with the target coding block and the reference block.

6. The method according to any one of clauses 3-5, wherein extracting, at the first convolutional layer of the CNN filter, the spatial features of the image data associated with the target coding block and the reference block comprises:
   applying a first set of filter kernels to image data associated with the target coding block, to generate feature maps associated with the target coding block; and
   applying a second set of filter kernels to image data associated with the reference block, to generate feature maps associated with the reference block.

7. The method according to any one of clauses 3-6, wherein the CNN filter comprises one or more convolutional layers subsequent to the first convolutional layer, each of the one or more convolutional layers using one or more 3 x3 filter kernels.

8. The method according to clause 7, wherein the first convolutional layer has 32 filter kernels, and the one or more subsequent layers comprise at least:
   a second convolutional layer having 16 filter kernels,
   a third convolutional layer having 8 filter kernels, and
   a fourth convolutional layer having 4 filter kernels.

9. The method according to any one of clauses 2-8, wherein executing the CNN filter to determine the residual associated with the target coding block based on the input image data comprises:
   performing nonlinear mapping to output of each of the plurality of convolutional layers, wherein the performing of the nonlinear mapping uses a rectified linear unit.

10. The method according to any one of clauses 1-9, wherein the target coding block is a reconstructed block generated by a video encoding process.

11. The method according to any one of clauses 1-10, wherein the reference block is a co-located block of the target coding block in a reference picture.

12. The method according to any one of clauses 1-11, wherein the target coding block is a coding tree unit (CTU).

13. The method according to any one of clauses 1-12, wherein the image data associated with the target coding block and the reference block comprises:
   an extended region of the target coding block; and
   an extended region of the reference block.

14. The method according to clause 13, wherein the extended region of the target coding block comprises one or more neighboring rows and one or more neighboring columns of the target coding block.

15. The method according to any one of clauses 1-14, further comprising:
before the residual associated with the target coding block is determined, training the CNN filter based on a training data set, the training data set comprising a training block and extended region of the training block.

16. The method according to clause 15, wherein training the CNN filter comprises:
applying the motion estimation to the training block before the training is started.

17. The method according to any one of clauses 1-16, further comprising:
determining a first rate distortion associated with the target coding block, when the CNN filter is disabled;
determining a second rate distortion associated with the target coding block, when the CNN filter is enabled;
perform a comparison of the first rate distortion and the second rate distortion; and
signaling, based on the comparison, a flag indicating whether the CNN filter is switched on or off.

18. The method according to clause 17, wherein the flag is signaled in at least one of a picture parameter set (PPS), a picture header, or a slice header.

19. The method according to any one of clauses 17 and 18, wherein the flag is a frame-level flag, wherein when the frame-level flag is turned off, the CNN filter is disabled for a frame associated with the frame-level flag.

20. The method according to any one of clauses 17 and 18, wherein the flag is a CTU-level flag, wherein when the CTU-level flag is turned off, the CNN filter is disabled for a CTU associated with the CTU-level flag.

21. The method according to clause 20, wherein the flag is signaled in a table which comprises a plurality of CTU-level flags corresponding to a plurality of CTUs respectively, each of the plurality of CTU-level flags indicating whether the CNN filter is enabled or disabled for the corresponding CTU.

22. A system for encoding video content, the system comprising:
a memory storing a set of instructions; and
one or more processors configured to execute the set of instructions to cause the system to perform operations comprising:
applying motion estimation to a target coding block, to determine a reference block of the target coding block;
inputting, to a convolutional neural network (CNN) filter, image data associated with the target coding block and the reference block; and
executing the CNN filter to determine a residual associated with the target coding block based on the input image data.

23. The system according to clause 22, wherein the CNN filter comprises a plurality of convolutional layers, each of the plurality of convolutional layers using one or more filter kernels to generate one or more feature maps respectively.

24. The system according to clause 23, wherein, in executing the CNN filter to determine the residual associated with the target coding block based on the input image data, the one or more processors are configured to execute the set of instructions to cause the system to perform:
extracting, at a first convolutional layer of the CNN filter, spatial features of the image data associated with the target coding block and the reference block.

25. The system according to clause 24, wherein the one or more processors are configured to execute the set of instructions to cause the system to perform:
fusing the extracted spatial features; and
inputting the fused spatial features to a subsequent convolutional layer of the first convolutional layer.

26. The system according to any one of clauses 24 and 25, wherein the first convolutional layer uses one or more 5×5 filter kernels to extract the spatial features of the image data associated with the target coding block and the reference block.

27. The system according to any one of clauses 24-26, wherein, in extracting, at the first convolutional layer of the CNN filter, the spatial features of the image data associated with the target coding block and the reference block, the one or more processors are configured to execute the set of instructions to cause the system to perform:
applying a first set of filter kernels to image data associated with the target coding block, to generate feature maps associated with the target coding block; and
applying a second set of filter kernels to image data associated with the reference block, to generate feature maps associated with the reference block.

28. The system according to any one of clauses 24-27, wherein the CNN filter comprises one or more convolutional layers subsequent to the first convolutional layer, each of the one or more convolutional layers using one or more 3 x3 filter kernels.

29. The system according to clause 28, wherein the first convolutional layer has 32 filter kernels, and the one or more subsequent layers comprise at least:
a second convolutional layer having 16 filter kernels,
a third convolutional layer having 8 filter kernels, and
a fourth convolutional layer having 4 filter kernels.

30. The system according to any one of clauses 23-29, wherein, in executing the CNN filter to determine the residual associated with the target coding block based on the input image data, the one or more processors are configured to execute the set of instructions to cause the system to perform:
performing nonlinear mapping to output of each of the plurality of convolutional layers, wherein the performing of the nonlinear mapping uses a rectified linear unit.

31. The system according to any one of clauses 22-30, wherein the target coding block is a reconstructed block generated by a video encoding process.

32. The system according to any one of clauses 22-31, wherein the reference block is a co-located block of the target coding block in a reference picture.

33. The system according to any one of clauses 22-32, wherein the target coding block is a coding tree unit (CTU).

34. The system according to any one of clauses 22-33, wherein the image data associated with the target coding block and the reference block comprises:
an extended region of the target coding block; and
an extended region of the reference block.

35. The system according to clause 34, wherein the extended region of the target coding block comprises one or more neighboring rows and one or more neighboring columns of the target coding block.

36. The system according to any one of clauses 22-35, wherein the one or more processors are configured to execute the set of instructions to cause the system to perform:

before the residual associated with the target coding block is determined, training the CNN filter based on a training data set, the training data set comprising a training block and extended region of the training block.

37. The system according to clause 36, wherein, in training the CNN filter, the one or more processors are configured to execute the set of instructions to cause the system to perform:
applying the motion estimation to the training block before the training is started.

38. The system according to any one of clauses 22-37, wherein the one or more processors are configured to execute the set of instructions to cause the system to perform:
determining a first rate distortion associated with the target coding block, when the CNN filter is disabled;
determining a second rate distortion associated with the target coding block, when the CNN filter is enabled;
perform a comparison of the first rate distortion and the second rate distortion; and
signaling, based on the comparison, a flag indicating whether the CNN filter is switched on or off.

39. The system according to clause 38, wherein the flag is signaled in at least one of a picture parameter set (PPS), a picture header, or a slice header.

40. The system according to any one of clauses 38 and 39, wherein the flag is a frame-level flag, wherein when the frame-level flag is turned off, the CNN filter is disabled for a frame associated with the frame-level flag.

41. The system according to any one of clauses 38 and 39, wherein the flag is a CTU-level flag, wherein when the CTU-level flag is turned off, the CNN filter is disabled for a CTU associated with the CTU-level flag.

42. The system according to clause 41, wherein the flag is signaled in a table which comprises a plurality of CTU-level flags corresponding to a plurality of CTUs respectively, each of the plurality of CTU-level flags indicating whether the CNN filter is enabled or disabled for the corresponding CTU.

43. A non-transitory computer readable medium that stores a set of instructions that is executable by one or more processors of an apparatus to cause the apparatus to initiate a method for encoding video content, the method comprising:
applying motion estimation to a target coding block, to determine a reference block of the target coding block;
inputting, to a convolutional neural network (CNN) filter, image data associated with the target coding block and the reference block; and
executing the CNN filter to determine a residual associated with the target coding block based on the input image data.

44. The non-transitory computer readable medium according to clause 43, wherein the CNN filter comprises a plurality of convolutional layers, each of the plurality of convolutional layers using one or more filter kernels to generate one or more feature maps respectively.

45. The non-transitory computer readable medium according to clause 44, wherein executing the CNN filter to determine the residual associated with the target coding block based on the input image data comprises:
extracting, at a first convolutional layer of the CNN filter, spatial features of the image data associated with the target coding block and the reference block.

46. The non-transitory computer readable medium according to clause 45, further comprising:
fusing the extracted spatial features; and
inputting the fused spatial features to a subsequent convolutional layer of the first convolutional layer.

47. The non-transitory computer readable medium according to any one of clauses 45 and 46, wherein the first convolutional layer uses one or more 5×5 filter kernels to extract the spatial features of the image data associated with the target coding block and the reference block.

48. The non-transitory computer readable medium according to any one of clauses 45-47, wherein extracting, at the first convolutional layer of the CNN filter, the spatial features of the image data associated with the target coding block and the reference block comprises:
applying a first set of filter kernels to image data associated with the target coding block, to generate feature maps associated with the target coding block; and
applying a second set of filter kernels to image data associated with the reference block, to generate feature maps associated with the reference block.

49. The non-transitory computer readable medium according to any one of clauses 45-48, wherein the CNN filter comprises one or more convolutional layers subsequent to the first convolutional layer, each of the one or more convolutional layers using one or more 3 x3 filter kernels.

50. The non-transitory computer readable medium according to clause 49, wherein the first convolutional layer has 32 filter kernels, and the one or more subsequent layers comprise at least:
a second convolutional layer having 16 filter kernels,
a third convolutional layer having 8 filter kernels, and
a fourth convolutional layer having 4 filter kernels.

51. The non-transitory computer readable medium according to any one of clauses 44-50, wherein executing the CNN filter to determine the residual associated with the target coding block based on the input image data comprises:
performing nonlinear mapping to output of each of the plurality of convolutional layers, wherein the performing of the nonlinear mapping uses a rectified linear unit.

52. The non-transitory computer readable medium according to any one of clauses 43-51, wherein the target coding block is a reconstructed block generated by a video encoding process.

53. The non-transitory computer readable medium according to any one of clauses 43-52, wherein the reference block is a co-located block of the target coding block in a reference picture.

54. The non-transitory computer readable medium according to any one of clauses 43-53, wherein the target coding block is a coding tree unit (CTU).

55. The non-transitory computer readable medium according to any one of clauses 43-54, wherein the image data associated with the target coding block and the reference block comprises:
an extended region of the target coding block; and
an extended region of the reference block.

56. The non-transitory computer readable medium according to clause 55, wherein the extended region of the target coding block comprises one or more neighboring rows and one or more neighboring columns of the target coding block.

57. The non-transitory computer readable medium according to any one of clauses 43-56, further comprising:
before the residual associated with the target coding block is determined, training the CNN filter based on a training data set, the training data set comprising a training block and extended region of the training block.

58. The non-transitory computer readable medium according to clause 57, wherein training the CNN filter comprises:
applying the motion estimation to the training block before the training is started.

59. The non-transitory computer readable medium according to any one of clauses 43-55, further comprising:
determining a first rate distortion associated with the target coding block, when the CNN filter is disabled;
determining a second rate distortion associated with the target coding block, when the CNN filter is enabled;
perform a comparison of the first rate distortion and the second rate distortion; and
signaling, based on the comparison, a flag indicating whether the CNN filter is switched on or off.

60. The non-transitory computer readable medium according to clause 59, wherein the flag is signaled in at least one of a picture parameter set (PPS), a picture header, or a slice header.

61. The non-transitory computer readable medium according to any one of clauses 59 and 60, wherein the flag is a frame-level flag, wherein when the frame-level flag is turned off, the CNN filter is disabled for a frame associated with the frame-level flag.

62. The non-transitory computer readable medium according to any one of clauses 59 and 60, wherein the flag is a CTU-level flag, wherein when the CTU-level flag is turned off, the CNN filter is disabled for a CTU associated with the CTU-level flag.

63. The non-transitory computer readable medium according to clause 62, wherein the flag is signaled in a table which comprises a plurality of CTU-level flags corresponding to a plurality of CTUs respectively, each of the plurality of CTU-level flags indicating whether the CNN filter is enabled or disabled for the corresponding CTU.

64. A computer-implemented video decoding method, comprising:
decoding a video bitstream to generate a reconstructed coding block;
applying motion estimation to the reconstructed coding block, to determine a reference block of the reconstructed coding block; and
executing a convolutional neural network (CNN) filter to determine, based on the reference block, a residual associated with the reconstructed coding block.

65. The method according to clause 64, wherein the CNN filter comprises a plurality of convolutional layers, each of the plurality of convolutional layers using one or more filter kernels to generate one or more feature maps respectively.

66. The method according to clause 65, wherein executing the CNN filter to determine, based on the reference block, the residual associated with the reconstructed coding block comprises:
extracting, at a first convolutional layer of the CNN filter, spatial features of the reconstructed coding block and the reference block.

67. The method according to clause 66, further comprising:
fusing the extracted spatial features; and inputting the fused spatial features to a subsequent convolutional layer of the first convolutional layer.

68. The method according to any one of clauses 66 and 67, wherein the first convolutional layer uses one or more 5 x5 filter kernels to extract the spatial features of the reconstructed coding block and the reference block.

69. The method according to any one of clauses 66-68, wherein extracting, at the first convolutional layer of the CNN filter, the spatial features of the reconstructed coding block and the reference block comprises:
applying a first set of filter kernels to the reconstructed coding block, to generate feature maps associated with the reconstructed coding block; and
applying a second set of filter kernels to the reference block, to generate feature maps associated with the reference block.

70. The method according to any one of clauses 66-69, wherein the CNN filter comprises one or more convolutional layers subsequent to the first convolutional layer, each of the one or more convolutional layers using one or more 3 x3 filter kernels.

71. The method according to clause 70, wherein the first convolutional layer has 32 filter kernels, and the one or more subsequent layers comprise at least:
a second convolutional layer having 16 filter kernels,
a third convolutional layer having 8 filter kernels, and
a fourth convolutional layer having 4 filter kernels.

72. The method according to any one of clauses 65-71, wherein executing the CNN filter to determine, based on the reference block, the residual associated with the reconstructed coding block comprises:
performing nonlinear mapping to output of each of the plurality of convolutional layers, wherein the performing of the nonlinear mapping uses a rectified linear unit.

73. The method according to any one of clauses 64-72, wherein the reference block is a co-located block of the reconstructed coding block in a reconstructed reference picture.

74. The method according to any one of clauses 64-73, wherein the reconstructed coding block is a coding tree unit (CTU).

75. The method according to any one of clauses 64-74, wherein executing the CNN filter to determine, based on the reference block, the residual associated with the reconstructed coding block comprises determining the residual based on:
an extended region of the reconstructed coding block; and
an extended region of the reference block.

76. The method according to clause 75, wherein the extended region of the reconstructed coding block comprises one or more neighboring rows and one or more neighboring columns of the reconstructed coding block.

77. The method according to any one of clauses 64-76, further comprising:
before the residual associated with the reconstructed coding block is determined, training the CNN filter based on a training data set, the training data set comprising a training block and extended region of the training block.

78. The method according to clause 77, wherein training the CNN filter comprises:
applying the motion estimation to the training block before the training is started.

79. The method according to any one of clauses 64-78, further comprising:
determining, based on a flag, whether the CNN filter is switched on or off.

80. The method according to clause 79, wherein the flag is signaled in at least one of a picture parameter set (PPS), a picture header, or a slice header.

81. The method according to any one of clauses 79 and 80, wherein the flag is a frame-level flag, and the method further comprises: in response to the frame-level flag being turned off, determining that the CNN filter is disabled for a frame associated with the frame-level flag.

82. The method according to any one of clauses 79 and 80, wherein the flag is a CTU-level flag, and the method further comprises: in response to the CTU-level flag being turned off, determining that the CNN filter is disabled for a CTU associated with the CTU-level flag.

83. The method according to clause 82, wherein the flag is signaled in a table which comprises a plurality of CTU-level flags corresponding to a plurality of CTUs respectively, each of the plurality of CTU-level flags indicating whether the CNN filter is enabled or disabled for the corresponding CTU.

84. A system for decoding video content, the system comprising:
 a memory storing a set of instructions; and
 one or more processors configured to execute the set of instructions to cause the system to perform operations comprising:
  decoding a video bitstream to generate a reconstructed coding block;
  applying motion estimation to the reconstructed coding block, to determine a reference block of the reconstructed coding block; and
  executing a convolutional neural network (CNN) filter to determine, based on the reference block, a residual associated with the reconstructed coding block.

85. The system according to clause 84, wherein the CNN filter comprises a plurality of convolutional layers, each of the plurality of convolutional layers using one or more filter kernels to generate one or more feature maps respectively.

86. The system according to clause 85, wherein in executing the CNN filter to determine, based on the reference block, the residual associated with the reconstructed coding block, the one or more processors are configured to execute the set of instructions to cause the system to further perform:
 extracting, at a first convolutional layer of the CNN filter, spatial features of the reconstructed coding block and the reference block.

87. The system according to clause 86, wherein the one or more processors are configured to execute the set of instructions to cause the system to further perform:
 fusing the extracted spatial features; and
 inputting the fused spatial features to a subsequent convolutional layer of the first convolutional layer.

88. The system according to any one of clauses 86 and 87, wherein the first convolutional layer uses one or more 5 x5 filter kernels to extract the spatial features of the reconstructed coding block and the reference block.

89. The system according to any one of clauses 86-88, wherein in extracting, at the first convolutional layer of the CNN filter, the spatial features of the reconstructed coding block and the reference block, the one or more processors are configured to execute the set of instructions to cause the system to further perform:
 applying a first set of filter kernels to the reconstructed coding block, to generate feature maps associated with the reconstructed coding block; and
 applying a second set of filter kernels to the reference block, to generate feature maps associated with the reference block.

90. The system according to any one of clauses 86-89, wherein the CNN filter comprises one or more convolutional layers subsequent to the first convolutional layer, each of the one or more convolutional layers using one or more 3 x3 filter kernels.

91. The system according to clause 90, wherein the first convolutional layer has 32 filter kernels, and the one or more subsequent layers comprise at least:
 a second convolutional layer having 16 filter kernels,
 a third convolutional layer having 8 filter kernels, and
 a fourth convolutional layer having 4 filter kernels.

92. The system according to any one of clauses 85-91, wherein in executing the CNN filter to determine, based on the reference block, the residual associated with the reconstructed coding block, the one or more processors are configured to execute the set of instructions to cause the system to further perform:
 performing nonlinear mapping to output of each of the plurality of convolutional layers, wherein the performing of the nonlinear mapping uses a rectified linear unit.

93. The system according to any one of clauses 85-92, wherein the reference block is a co-located block of the reconstructed coding block in a reconstructed reference picture.

94. The system according to any one of clauses 85-93, wherein the reconstructed coding block is a coding tree unit (CTU).

95. The system according to any one of clauses 84-94, wherein the one or more processors are configured to execute the set of instructions to cause the system to eecute the CNN filter to determine the residual based on:
 an extended region of the reconstructed coding block; and
 an extended region of the reference block.

96. The system according to clause 95, wherein the extended region of the reconstructed coding block comprises one or more neighboring rows and one or more neighboring columns of the reconstructed coding block.

97. The system according to any one of clauses 84-96, wherein the one or more processors are configured to execute the set of instructions to cause the system to further perform:
 before the residual associated with the reconstructed coding block is determined, training the CNN filter based on a training data set, the training data set comprising a training block and extended region of the training block.

98. The system according to clause 97, wherein in training the CNN filter, the one or more processors are configured to execute the set of instructions to cause the system to further perform:
 applying the motion estimation to the training block before the training is started.

99. The system according to any one of clauses 84-98, wherein the one or more processors are configured to execute the set of instructions to cause the system to further perform:
 determining, based on a flag, whether the CNN filter is switched on or off.

100. The system according to clause 99, wherein the flag is signaled in at least one of a picture parameter set (PPS), a picture header, or a slice header.

101. The system according to any one of clauses 99 and 100, wherein the flag is a frame-level flag, and the one or more processors are configured to execute the set of instructions to cause the system to further perform: in response to the frame-level flag being turned off, determining that the CNN filter is disabled for a frame associated with the frame-level flag.

102. The system according to any one of clauses 99 and 100, wherein the flag is a CTU-level flag, and the one or more processors are configured to execute the set of instructions to cause the system to further perform: in response to the CTU-level flag being turned off, determining that the CNN filter is disabled for a CTU associated with the CTU-level flag.

103. The system according to clause 102, wherein the flag is signaled in a table which comprises a plurality of CTU-level flags corresponding to a plurality of CTUs respectively, each of the plurality of CTU-level flags indicating whether the CNN filter is enabled or disabled for the corresponding CTU.

104. A non-transitory computer readable medium that stores a set of instructions that is executable by one or more processors of an apparatus to cause the apparatus to initiate a method for encoding video content, the method comprising:
 decoding a video bitstream to generate a reconstructed coding block;
 applying motion estimation to the reconstructed coding block, to determine a reference block of the reconstructed coding block; and
 executing a convolutional neural network (CNN) filter to determine, based on the reference block, a residual associated with the reconstructed coding block.

105. The non-transitory computer readable medium according to clause 104, wherein the CNN filter comprises a plurality of convolutional layers, each of the plurality of convolutional layers using one or more filter kernels to generate one or more feature maps respectively.

106. The non-transitory computer readable medium according to clause 105, wherein executing the CNN filter to determine, based on the reference block, the residual associated with the reconstructed coding block comprises:
 extracting, at a first convolutional layer of the CNN filter, spatial features of the reconstructed coding block and the reference block.

107. The non-transitory computer readable medium according to clause 106, further comprising:
 fusing the extracted spatial features; and
 inputting the fused spatial features to a subsequent convolutional layer of the first convolutional layer.

108. The non-transitory computer readable medium according to any one of clauses 106 and 107, wherein the first convolutional layer uses one or more 5 x5 filter kernels to extract the spatial features of the reconstructed coding block and the reference block.

109. The non-transitory computer readable medium according to any one of clauses 106-108, wherein extracting, at the first convolutional layer of the CNN filter, the spatial features of the reconstructed coding block and the reference block comprises:
 applying a first set of filter kernels to the reconstructed coding block, to generate feature maps associated with the reconstructed coding block; and
 applying a second set of filter kernels to the reference block, to generate feature maps associated with the reference block.

110. The non-transitory computer readable medium according to any one of clauses 106-109, wherein the CNN filter comprises one or more convolutional layers subsequent to the first convolutional layer, each of the one or more convolutional layers using one or more 3 x3 filter kernels.

111. The non-transitory computer readable medium according to clause 110, wherein the first convolutional layer has 32 filter kernels, and the one or more subsequent layers comprise at least:
 a second convolutional layer having 16 filter kernels,
 a third convolutional layer having 8 filter kernels, and
 a fourth convolutional layer having 4 filter kernels.

112. The non-transitory computer readable medium according to any one of clauses 105-111, wherein executing the CNN filter to determine, based on the reference block, the residual associated with the reconstructed coding block comprises:
 performing nonlinear mapping to output of each of the plurality of convolutional layers, wherein the performing of the nonlinear mapping uses a rectified linear unit.

113. The non-transitory computer readable medium according to any one of clauses 104-112, wherein the reference block is a co-located block of the reconstructed coding block in a reconstructed reference picture.

114. The non-transitory computer readable medium according to any one of clauses 104-113, wherein the reconstructed coding block is a coding tree unit (CTU).

115. The non-transitory computer readable medium according to any one of clauses 104-114, wherein executing the CNN filter to determine, based on the reference block, the residual associated with the reconstructed coding block comprises determining the residual based on:
 an extended region of the reconstructed coding block; and
 an extended region of the reference block.

116. The non-transitory computer readable medium according to clause 115, wherein the extended region of the reconstructed coding block comprises one or more neighboring rows and one or more neighboring columns of the reconstructed coding block.

117. The non-transitory computer readable medium according to any one of clauses 104-116, wherein the method further comprises:
 before the residual associated with the reconstructed coding block is determined, training the CNN filter based on a training data set, the training data set comprising a training block and extended region of the training block.

118. The non-transitory computer readable medium according to clause 117, wherein training the CNN filter comprises:
 applying the motion estimation to the training block before the training is started.

119. The non-transitory computer readable medium according to any one of clauses 104-118, wherein the method further comprises:
 determining, based on a flag, whether the CNN filter is switched on or off.

120. The non-transitory computer readable medium according to clause 119, wherein the flag is signaled in at least one of a picture parameter set (PPS), a picture header, or a slice header.

121. The non-transitory computer readable medium according to any one of clauses 119 and 120, wherein the flag is a frame-level flag, and the method further comprises:
 in response to the frame-level flag being turned off, determining that the CNN filter is disabled for a frame associated with the frame-level flag.

122. The non-transitory computer readable medium according to any one of clauses 119 and 120, wherein the flag is a CTU-level flag, and the method further comprises:
 in response to the CTU-level flag being turned off, determining that the CNN filter is disabled for a CTU associated with the CTU-level flag.

123. The non-transitory computer readable medium according to clause 122, wherein the flag is signaled in a table which comprises a plurality of CTU-level flags corresponding to a plurality of CTUs respectively, each of the plurality of CTU-level flags indicating whether the CNN filter is enabled or disabled for the corresponding CTU.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A computer-implemented video encoding method, comprising:
    determining a first rate distortion associated with a target coding block based on a convolutional neural network (CNN) filter being disabled, the CNN filter being configured to determine a residual associated with the target coding block based on image data associated with the target coding block and a reference block of the target coding block, the reference block being determined by applying motion estimation to the target coding block;
    determining a second rate distortion associated with the target coding block based on the CNN filter being enabled;
    perform a comparison of the first rate distortion and the second rate distortion; and
    based on the comparison, encoding the target coding block and setting a flag indicating whether the CNN filter is to be enabled or disabled.

2. The method according to claim 1, wherein the flag is signaled in at least one of a picture parameter set (PPS), a picture header, or a slice header.

3. The method according to claim 1, wherein the flag is a frame-level flag, and when the frame-level flag indicates that the CNN filter is to be disabled, the CNN filter is disabled for a frame associated with the frame-level flag.

4. The method according to claim 1, wherein the flag is a CTU-level flag, and when the CTU-level flag indicates that the CNN filter is to be disabled, the CNN filter is disabled for a CTU associated with the CTU-level flag.

5. The method according to claim 4, wherein the flag is signaled in a table that comprises a plurality of CTU-level flags corresponding to a plurality of CTUs respectively, each of the plurality of CTU-level flags indicating whether the CNN filter is to be enabled or disabled for the corresponding CTU.

6. The method according to claim 1, wherein the CNN filter comprises a plurality of convolutional layers, each of the plurality of convolutional layers using one or more filter kernels to generate one or more feature maps respectively, and executing the CNN filter to determine the residual associated with the target coding block based on input image data comprises:
    extracting, at a first convolutional layer of the CNN filter, spatial features of the image data associated with the target coding block and the reference block.

7. The method according to claim 1, wherein the CNN filter is trained using a training data set comprising:
    a motion-compensated training block, and
    an un-motion-compensated extended region of the motion compensated training block,
    the motion-compensated training block being a predicted block based on a motion vector and a reference picture, and the un-motion-compensated extended region comprising unpredicted image data that is not predicted based on the motion vector or reference picture.

8. A computer-implemented video decoding method, comprising:
    decoding a video bitstream to generate a reconstructed coding block;
    applying motion estimation to the reconstructed coding block, to determine a reference block of the reconstructed coding block;
    determining, based on a flag, whether a convolutional neural network (CNN) filter is enabled or disabled; and
    executing the CNN filter to determine, based on the reference block, a residual associated with the reconstructed coding block when the CNN filter is enabled,
    wherein the flag is generated based on a comparison of a first rate distortion and a second rate distortion associated with the coding block,
    wherein the first rate distortion is determined based on the CNN filter being disabled, and
    wherein the second rate distortion is determined based on the CNN filter being enabled.

9. The method according to claim 8, wherein the flag is signaled in at least one of a picture parameter set (PPS), a picture header, or a slice header.

10. The method according to claim 8, wherein the flag is a frame-level flag, and the method further comprises: in response to the frame-level flag indicating that the CNN filter is disabled, determining that the CNN filter is disabled for a frame associated with the frame-level flag.

11. The method according to claim 8, wherein the flag is a CTU-level flag, and the method further comprises: in response to the CTU-level flag indicating that the CNN filter is disabled, determining that the CNN filter is disabled for a CTU associated with the CTU-level flag.

12. The method according to claim 11, wherein the flag is signaled in a table that comprises a plurality of CTU-level flags corresponding to a plurality of CTUs respectively, each of the plurality of CTU-level flags indicating whether the CNN filter is enabled or disabled for the corresponding CTU.

13. The method according to claim 8, wherein the CNN filter comprises a plurality of convolutional layers, each of the plurality of convolutional layers using one or more filter kernels to generate one or more feature maps respectively, and executing the CNN filter to determine, based on the reference block, a residual associated with the reconstructed coding block comprises:
    extracting, at a first convolutional layer of the CNN filter, spatial features of the reconstructed coding block and the reference block.

14. The method according to claim 8, wherein the CNN filter is trained using a training data set comprising:
    a motion-compensated training block, and
    an un-motion-compensated extended region of the motion compensated training block,
    the motion-compensated training block being a predicted block based on a motion vector and a reference picture, and the un-motion-compensated extended region comprising unpredicted image data that is not predicted based on the motion vector or reference picture.

15. A computer-implemented method of storing a bitstream of a video, the method comprising:
    determining a first rate distortion associated with a target coding block based on a convolutional neural network (CNN) filter being disabled, the CNN filter being configured to determine a residual associated with the target coding block based on image data associated with the target coding block and a reference block of the target coding block, the reference block being determined by applying motion estimation to the target coding block;
    determining a second rate distortion associated with the target coding block based on the CNN filter being enabled;
    perform a comparison of the first rate distortion and the second rate distortion;
    generating, based on the comparison, a bitstream comprising a flag indicating whether the CNN filter is to be enabled or disabled; and
    storing the bitstream in a non-transitory computer readable medium.

16. The method according to claim 15, wherein the flag is set in at least one of a picture parameter set (PPS), a picture header, or a slice header.

17. The method according to claim 15, wherein the flag is a frame-level flag, and when the frame-level flag indicates that the CNN filter is to be disabled, the CNN filter is disabled for a frame associated with the frame-level flag.

18. The method according to claim 15, wherein the flag is a CTU-level flag, and when the CTU-level flag indicates that the CNN filter is to be disabled, the CNN filter is disabled for a CTU associated with the CTU-level flag.

19. The method according to claim 18, wherein the flag is set in a table that comprises a plurality of CTU-level flags corresponding to a plurality of CTUs respectively, each of the plurality of CTU-level flags indicating whether the CNN filter is to be enabled or disabled for the corresponding CTU.

20. The method according to claim 15, wherein the CNN filter comprises a plurality of convolutional layers, each of the plurality of convolutional layers using one or more filter kernels to generate one or more feature maps respectively, and executing the CNN filter to determine the residual associated with the target coding block based on input image data comprises:
    extracting, at a first convolutional layer of the CNN filter, spatial features of the image data associated with the target coding block and the reference block.

* * * * *